Sept. 13, 1955  A. O. PRILL  2,717,786
STOP MEANS TO PREVENT A KNEE ACTION TYPE WHEEL MOUNT
FROM LOWERING WITH RESPECT TO ITS VEHICLE FRAME
Filed May 23, 1952  2 Sheets-Sheet 1
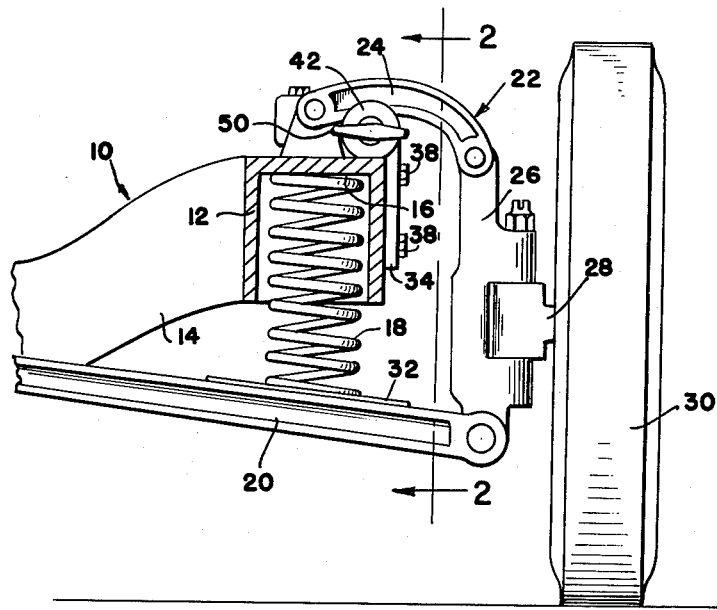
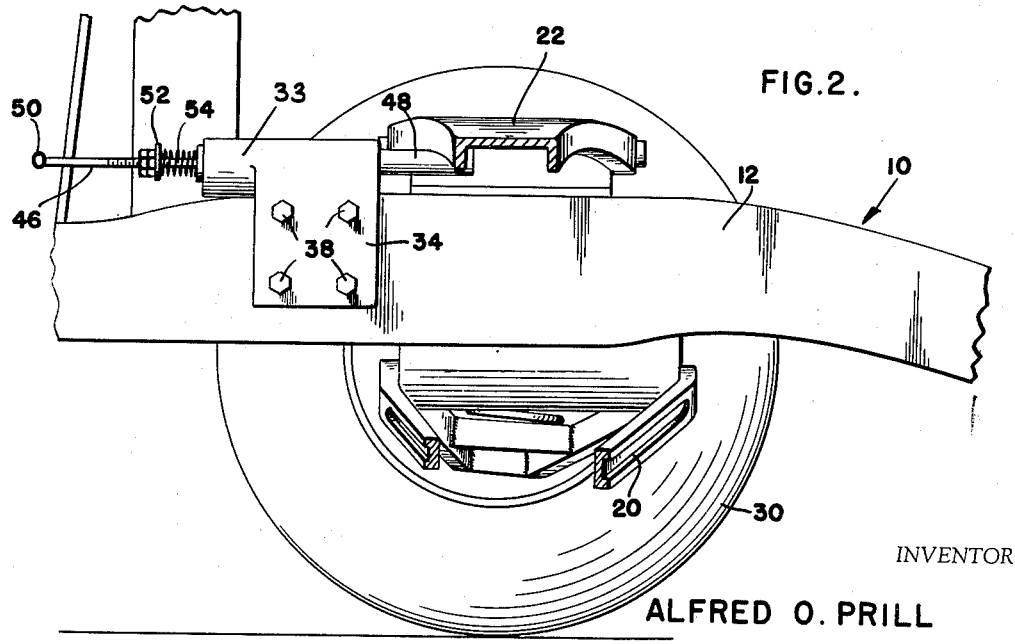
INVENTOR
ALFRED O. PRILL
BY
ATTORNEY

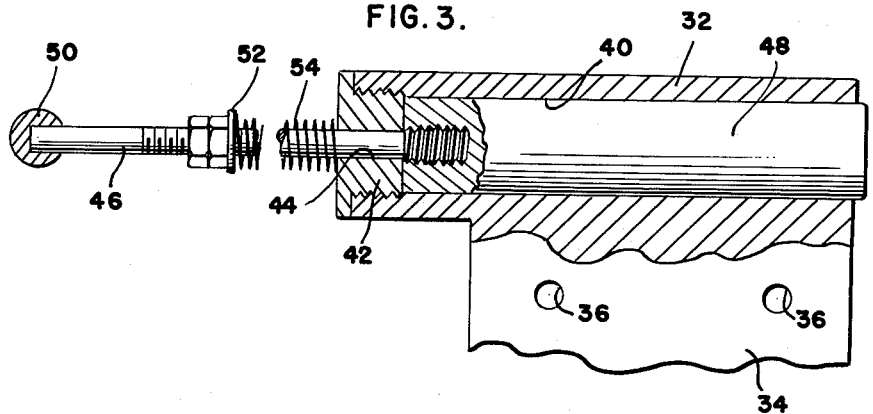
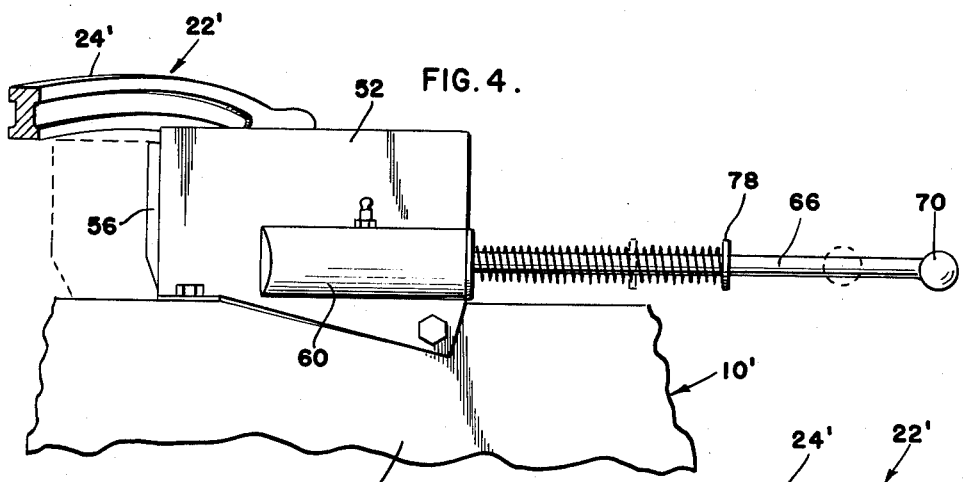
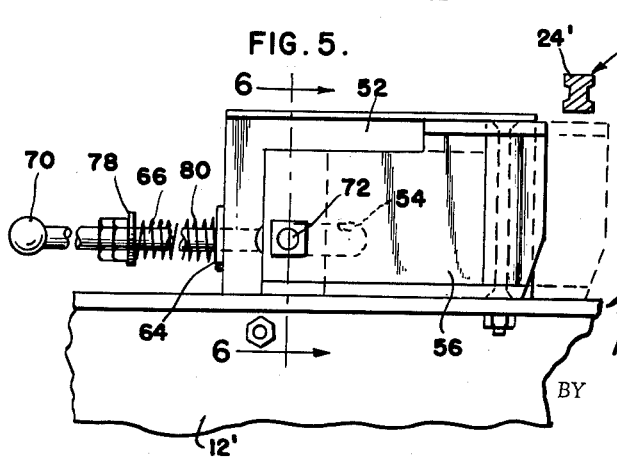
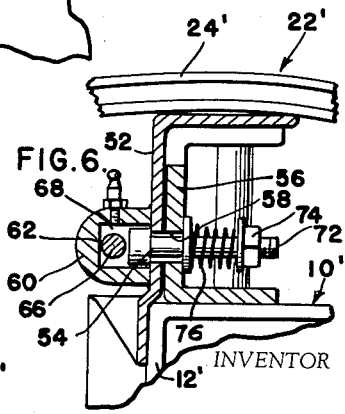

United States Patent Office 2,717,786
Patented Sept. 13, 1955

2,717,786

STOP MEANS TO PREVENT A KNEE ACTION TYPE WHEEL MOUNT FROM LOWERING WITH RESPECT TO ITS VEHICLE FRAME

Alfred O. Prill, Romulus, Mich.

Application May 23, 1952, Serial No. 289,597

1 Claim. (Cl. 280—150)

The present invention relates to a wheel lifting device for a vehicle and more particularly for a vehicle of the type employing what is commonly referred to as the "knee action" spring suspension.

In recent years with the "stream lining" of vehicle bodies the use of the bumper jack has become prevalent with the result that the bodies of the vehicles must be raised to excessive heights before the spring suspensions will lift the tires out of contact with the ground. In many instances a bumper jack must be capable of lifting the bumper a distance of nearly twelve inches before the tire will clear the floor or ground. Such practice not only requires the use of excessively bulky jacks but also requires the expenditure of considerable labor in elevating the vehicle.

The primary object of this invention is to enable a vehicle to be lifted with a less bulky jack.

Another object is to conserve labor and avoid the necessity of exerting excessive and unnecessary lifting effort on the frame of the vehicle in order to free the tire from contact with the ground.

The above and other objects may be attained by employing this invention which embodies among its features a bolt carried by the frame of a vehicle having a spring suspension including an upper guide arm, yielding means carried by the frame and engaging the bolt for holding said bolt retracted, and manually actuated means carried by the bolt for moving it against the effort of the yielding means and projecting it into the path of movement of the upper guide arm.

Other features include a bolt guiding barrel adapted to be mounted on the frame of a conventional vehicle having an upper guide arm immediately in front thereof and housing the bolt for movement in a rectilinear path which intersects the path of movement of the upper guide arm.

Still other features include a guide plate mounted on the frame of the vehicle adjacent the front of the guide arm, a block mounted in the guide for movement in a rectilinear path into the path of movement of the guide arm, a plunger carried by the guide plate for movement in a rectilinear path adjacent the block, means carried by the plunger and connected to the block for moving the block, yielding means carried by the guide plate and engaging the plunger for holding the block out of the path of movement of the guide arm, and manually actuated means carried by the plunger for moving the plunger against the effort of the yielding means and advancing the block in its rectilinear path into a position between the frame and the guide arm.

In the drawings:

Figure 1 is a fragmentary sectional view through the frame of a vehicle, having a conventional spring suspension of the "knee-action" type showing this invention applied thereto.

Figure 2 is a fragmentary sectional view taken substantially on the line 2—2 of Figure 1.

Figure 3 is an enlarged fragmentary longitudinal sectional view through one embodiment of this invention.

Figure 4 is a side view of a modified form of the invention.

Figure 5 is a view of the opposite side of the modified form of the invention, and Figure 6 is a fragmentary sectional view taken substantially on the line 6—6 of Figure 5.

Referring to the drawings in detail, a vehicle frame designated generally 10 comprises spaced side members 12 and cross members 14 equipped with conventional spring seats 16 in which the upper ends of compression springs 18 are received. Pivotally connected to a cross member 14 for movement in arcuate paths below the frame 10 are the lower guide arms 20 of a conventional "knee-action" spring suspension designated generally 22.

Upper guide arms 24 are pivotally carried by the frame member 12 to move in arcuate paths above the frame 10 and pivotally connected to the upper and lower guide arms 24 and 20 are knuckle joints 26 carrying laterally extending spindles 28 upon which wheels 30 are mounted to rotate. The lower ends of the springs 18 bear on bearing plates 32 carried by the lower guide arms 20 to yieldingly support the frame 10 on the wheels 30. The structure so far described is conventional with vehicles equipped with "knee-action" spring suspensions and forms no part of the invention except in combination therewith.

One embodiment of this invention comprises an elongated body 33 carrying adjacent one side an attaching plate or bracket 34 having openings 36 extending therethrough for the reception of bolts 38 by which the plate or bracket 34 is attached to a side bar 12 of the frame 10 slightly forwardly of the "knee-action" spring suspension 22. Extending longitudinally through the body 32 along an axis which intersects the arcuate path of movement of the adjacent upper guide arm 24 is a bore 40 into the end of which remote from the adjacent "knee-action" spring suspension is threaded a plug 42 having an axial opening 44 extending therethrough.

Mounted for longitudinal sliding movement through the opening 44 is a push rod 46 and threadedly engaged with the push rod 46 within the bore 40 is a bolt 48. The push rod 46 projects forwardly through the front end of the vehicle and is provided at the end remote from the bolt 48 with a cross-handle 50. It will thus be seen that when the handle 50 is moved toward the rear of the vehicle, the bolt 48 will be moved into a position to intersect the path of movement of the upper guide arm 24.

Threadedly engaged with the push rod 46 intermediate the ends thereof and for longitudinal adjustment thereon is a stop 52 against which bears one end of a compression coiled spring 54, which encircles the push rod 46 between the plug 42 and stop 52. Said coiled spring 54 also bears against the plug 52 to yieldingly hold the bolt 48 retracted. It will thus be seen that the bolt 48 is normally held out of the path of movement of the upper guide arm 24 so that the operation of the spring suspension is in no way impaired during the normal operation of the vehicle.

In the modified form of the invention the vehicle frame 10' having spaced side bars 12' is equipped with the conventional "knee-action" spring suspensions designated generally 22' which include conventional upper guide arms 24' which move in arcuate paths above the side bars 12' in the conventional manner.

Mounted on the side bars 12' of the frame 10' slightly in advance of the upper guide arms 22' are vertically extending guide members 52 having elongated longitudinal slots 54 extending therethrough. Mounted for sliding movement on the side bars 12' adjacent the guide members 52 are channel shaped blocks 56 which are adapted to be moved rearwardly along the tops of the side bars into intersecting relation to the paths of movement of the upper guide arms 24'. Formed in the web of each channel-shaped block 56 is an opening 58 which is adapted to register with the slot 54 in its respective adjacent guide member 52. Carried by the guide members 52 on the sides thereof remote from the blocks 56 are elongated guide sleeves 60 having elongated recesses 62 opening thereinto through the ends thereof remote from the adjacent guide arms 24'. Plugs 64 close the open ends of the recesses 62 and are provided with axial openings through which extend push rods 66 carrying within the recesses heads 68. The push rods 66 carry at their ends remote from the heads 68 suitable knobs 70 and carried by the heads 68 and projecting laterally therefrom and through the slots 54 and openings 58 are studs 72. It will thus be seen that as the push rods 66 are moved longitudinally through the openings in the plugs 64 the blocks 56 will be moved in unison therewith. Threadedly engaged with the studs 72 remote from the heads 68 are nuts 74, and encircling the studs 72 between the blocks 56 and the nuts 74 are compression coiled springs 76 which serve to yieldingly hold the blocks 56 in engagement with the adjacent guide members 52.

Threadedly engaged with the push rods 66 for longitudinal adjustment thereon intermediate the ends thereof are stops 78. Compression coiled springs 80 encircle the push rods between the plugs 64 and the stops 78 to yieldingly hold the blocks 56 out of the path of movement of the upper guide arms 24'.

In use when it is desired to elevate a wheel 30, pressure is applied to a cross handle 50 or 70 according to which type of device is in use to move its respective bolt 48 or block 56 into the path of movement of the adjacent upper guide arm 24 or 24'. The bolt or block is held projected while the frame 10 or 10' is being elevated until such time as the pressure of the spring 18 or a corresponding spring on its respective upper guide arm is sufficient to hold the bolt or block against movement under the influence of the spring 54 or 80 as the case may be. This will cause the upper guide arm to lift the wheel 30 in unison with the upward movement of the frame 10 or 10' so as to reduce lifting effort required to clear the wheel 30 from the ground. With the wheel thus elevated, it may be removed for replacement or repair and when this has been accomplished the wheel may be restored to the spindle 28 and the frame 10 or 10' lowered. As the frame descends and the wheel 30 again contacts the ground, the weight of the vehicle is transferred to the spring 18 which becomes slightly compressed thus causing the lower and upper guide arms to move upwardly and take the weight off of the bolt 48 or block 56 as the case may be so that it will move under the influence of its spring 54 or 80 out of the path of movement of its respective guide arm 24 or 24'.

While the present invention has been disclosed in connection with certain specific embodiments thereof, it is to be understood that these are by way of example rather than by way of limitations, and that the invention is to be defined by the attendant claim which should be given a scope as broad as is consistent with the prior art.

What is claimed is:

Means for locking a suspension assembly of an automobile, said means comprising a guide, a block mounted in said guide for movement in a rectilinear path into intersecting relation to the arcuate path of the suspension assembly, a push rod carried by the guide and offset from said block and separately connected thereto for moving said block in the rectilinear path, a compression spring encircling the push rod and engaging the guide for holding the block normally out of said arcuate path of said suspension assembly.

References Cited in the file of this patent

UNITED STATES PATENTS

| | | |
|---|---|---|
| 1,742,636 | Collins | Jan. 7, 1930 |
| 1,764,946 | Flynn | June 17, 1930 |
| 1,996,839 | Snyder | Apr. 9, 1935 |
| 2,061,025 | Dwork | Nov. 17, 1936 |
| 2,213,171 | Putnam | Aug. 27, 1940 |
| 2,413,289 | Carter | Dec. 31, 1946 |
| 2,475,478 | Clair | July 5, 1949 |

FOREIGN PATENTS

| | | |
|---|---|---|
| 5,968 | Great Britain | Apr. 19, 1890 |